UNITED STATES PATENT OFFICE.

FLETCHER B. HOLMES, OF WOODBURY, NEW JERSEY, ASSIGNOR TO THE E. I. DU PONT DE NEMOURS POWDER COMPANY, OF WILMINGTON, DELAWARE, A CORPORATION OF NEW JERSEY.

STABILIZED NITRATED STARCH.

No. 875,915.  Specification of Letters Patent.  Patented Jan. 7, 1908.

Application filed May 7, 1907. Serial No. 372,418.

*To all whom it may concern:*

Be it known that I, FLETCHER B. HOLMES, a citizen of the United States, residing at Woodbury, county of Gloucester, and State of New Jersey, have invented a new and useful Improvement in Stabilized Nitrated Starch, of which the following is a full, clear, and exact description.

The object of my invention is to produce stable nitrated starch.

Nitrated starch may be used as an explosive itself, or preferably may be used as a component part of an explosive, such as where it is mixed with sodium nitrate, potassium nitrate, or some other oxygen carrier, with or without the addition of other ingredients. The difficulty with nitrated starch is that it is very unstable, being liable to decomposition. When such nitrated starch decomposes, which it is liable to do at ordinary temperatures, it becomes liable to spontaneous combustion.

I have discovered that I can produce a stable nitrated starch by mixing with nitrated starch an ammonium salt of an oxygen acid of chromium. The mixing may be made in any manner to produce a good mixture. They may be mixed wet or dry and in any kind of a mixer. Preferably I mix the two in a finely divided powdered condition in a bowl provided with stirrers or paddles. Preferably I use a chromate of ammonia and of the chromates of ammonia I prefer the neutral ammonium chromate.

The following is an example of the manner in which my invention may be carried out, and the manner in which I have carried it out: With nitrated starch produced in the ordinary manner, I mix 3% of the neutral ammonium chromate $(NH_4)_2CrO_4$. I can and have used with success amounts greater than and amounts less than, the before mentioned 3%. The other chromates of ammonia may be used, for example, potassium ammonium chromate, $KNH_4CrO_4$, or the ammonium salts of an oxygen acid of chromium other than the chromate may also be used. As for example the bichromate $(NH_4)_2Cr_2O_7$.

I intend in the claims to cover my stable nitrated starch whether the same be used alone or as a component part with other materials in a powder.

Having now fully described my invention, what I claim and desire to protect by Letters Patent is:

1. A stable explosive, consisting of nitrated starch, mixed with a chromate of ammonia, the latter being in such proportion as to stabilize the nitrated starch.

2. A stable explosive, consisting of nitrated starch, mixed with three per cent. of a chromate of ammonia.

3. A stable explosive, consisting of nitrated starch, mixed with neutral ammonium chromate, the latter being in such proportion as to stabilize the nitrated starch.

4. A stable explosive, consisting of nitrated starch mixed with three per cent. of neutral ammonium chromate.

In testimony of which invention, I have hereunto set my hand, at Woodbury, N. J., on this 29th day of April, 1907.

FLETCHER B. HOLMES.

Witnesses:
J. FRANK WILSON, Jr.,
GEORGE E. PIERSON.